United States Patent [19]

Rowland et al.

[11] Patent Number: 5,537,664
[45] Date of Patent: Jul. 16, 1996

[54] METHODS AND APPARATUS FOR GENERATING I/O RECOVERY DELAYS IN A COMPUTER SYSTEM

[75] Inventors: Stephen T. Rowland; Dahmane Dahmani, both of Folsom, Calif.

[73] Assignee: Intel Corporation, Santa Clara, Calif.

[21] Appl. No.: 582,664

[22] Filed: Jan. 4, 1996

Related U.S. Application Data

[63] Continuation of Ser. No. 322,744, Oct. 13, 1994, abandoned, which is a continuation of Ser. No. 86,177, Jun. 30, 1993, abandoned.

[51] Int. Cl.⁶ .................................................. G06F 13/20
[52] U.S. Cl. ...................... 395/879; 395/287; 364/DIG. 1
[58] Field of Search .................................. 395/284, 387, 395/309, 310, 828, 879, 856

[56] References Cited

U.S. PATENT DOCUMENTS

| | | | |
|---|---|---|---|
| 4,980,678 | 12/1990 | Zenda | 345/3 |
| 5,056,110 | 10/1991 | Fu et al. | 375/257 |
| 5,065,313 | 11/1991 | Leinsford | 395/879 |
| 5,155,812 | 10/1992 | Ehlig et al. | 395/879 |
| 5,163,135 | 11/1992 | Nakamura | 395/287 |
| 5,201,036 | 4/1993 | Yoshimatsu | 395/550 |
| 5,220,659 | 6/1993 | Larson et al. | 395/500 |

OTHER PUBLICATIONS

Intel Corporation internal technical documentation; pp. 60 and 61.

*Primary Examiner*—Parshotam S. Lall
*Assistant Examiner*—Viet Vu
*Attorney, Agent, or Firm*—Blakely, Sokoloff, Taylor & Zafman

[57] ABSTRACT

A computer system comprising programmable I/O recovery includes a device selection unit, programmable I/O recovery time registers, and a decrementer for specifying I/O recovery times for a plurality of I/O peripheral components. The programmable I/O recovery time registers contain time values, and the time values are programmable by the user of the computer system. The computer system interfaces the I/O peripheral components on an external bus through a plurality of bus cycle signals generated by cycle generation logic. For each I/O bus cycle on the external bus, the device selection unit identifies the I/O device involved in the I/O bus cycle. The device selection unit selects a time value from the programmable I/O recovery time registers corresponding to the I/O device identified, and loads the time value selected in the decrementer. Upon termination of the bus cycle, the device selection unit generates a cycle start signal to enable counting in the decrementer. The decrementer begins to count down from the time value loaded, and when the decrementer reaches a terminal count, a ready signal is generated. The ready signal enables the cycle generation logic to generate a successive bus cycle for the same I/O peripheral component.

20 Claims, 6 Drawing Sheets

METHODS AND APPARATUS FOR GENERATING I/O RECOVERY DELAYS IN A COMPUTER SYSTEM

This is a continuation of application Ser. No. 08/322,744, filed Oct. 13, 1994, now abandoned, which is a continuation of application Ser. No. 08/086,177, filed Jun. 30, 1993 abandoned.

BACKGROUND OF THE INVENTION

1. Field of the Invention

The present invention relates to the field of interfacing peripheral devices to a computer system, and more particularly, to methods and apparatus for specifying input/output (I/O) recovery times.

2. Art Background

In order to integrate peripheral components, such as external memory cards, modems and storage devices, some computer systems utilize an open-ended architecture. The open ended computer architecture permits interfacing a number of peripheral components to the computer system. In general, computer systems comprise address, data and control buses to interface peripheral components with computer system resources. In order to interface peripheral components to a computer system via a bus, the computer bus comprises various bus specifications. For example, the computer bus specifications define the timing and voltage level for signals transmitted on the bus. Although defining a bus specification permits interfacing of peripheral devices, once the specification is defined, the specification can not be changed without losing compatibility with existing peripheral devices. However, it may be desirable to change the bus specifications because new technology permits an increased level of performance for bus interface specifications. Therefore, it is desirable to change bus specifications for interfacing new peripheral components while remaining compatible with existing peripheral components.

In addition to timing and voltage specifications, an input/output (I/O) recovery time specification is required to interface I/O peripheral devices to a computer bus. The I/O recovery time is defined as the length of time required for the I/O peripheral device to recover from a previous I/O access before a subsequent I/O access can successfully occur. Typically, the I/O recovery specification is only a limitation for I/O devices such as hard disk drives, floppy disk drives, and modems. The I/O recovery time is a function of each individual I/O peripheral device. For example, a hard disk drive requires time after an I/O access to re-position the head of the disk drive. In this example, the I/O recovery time is a limitation due to mechanical motion, and varies depending on the particular hard drive. The I/O recovery time may also be a protocol utilized by the peripheral component. For example, a modem comprises a handshake protocol to an external source, and the modem must complete the protocol before accepting an additional request. All I/O access delay times, whether mechanical or otherwise, may be generally classified as I/O recovery time.

I/O recovery times result in a computer system latency when successive accesses to I/O peripheral devices are desired. For example, a CPU may access a hard drive to obtain large amounts of data for processing. Because the CPU to hard drive data transfer is limited to a specific data block size, several accesses to the hard drive may be required. In such a case, the CPU accesses a first block of data on the hard drive. The I/O recovery time defines the time in which the CPU must wait before accessing a second block of data from the hard drive. Therefore, if the I/O recovery time is extensive, then much time is wasted waiting between access cycles.

Typically, computer systems address the problem of I/O recovery times by defining a maximum time for which successive accesses can occur. Under a standard bus specification, all I/O peripheral devices must operate under this minimal I/O recovery time specification. Therefore, in order to accommodate all peripheral components, the minimum I/O recovery time must accommodate the slowest I/O peripheral device. Because it is desirable to remain compatible with all existing peripheral components, the I/O recovery time must accommodate the slowest peripheral component. Although such a bus specification provides compatibility with all I/O peripheral devices, the specification forfeits the advantages of fast I/O recovery peripheral devices. Therefore, it is desirable to provide an I/O recovery time based on the specific peripheral device. In accessing large amounts of data from an I/O peripheral device, such an accommodation results in greatly improved system performance.

SUMMARY OF THE INVENTION

The methods and apparatus for programmable I/O recovery comprise a computer system including a device selection unit and programmable I/O recovery time registers. The computer system contains external and internal busses. The device selection unit is coupled to the external bus, and the programmable I/O recovery time registers are coupled to the internal bus. The external bus connects a plurality of input/output (I/O) devices to the computer system, and the internal bus connects a central processing unit (CPU) and memory. Bus transfers on the external bus are controlled by bus cycle generation logic which generates a plurality of bus cycle signals including an I/O address and a command. The device selection unit receives commands and an I/O address generated by the cycle generation logic. The programmable I/O recovery apparatus also comprises a decrementer to generate a ready signal to the bus cycle generation logic. The ready signal enables the bus cycle generation logic to generate a successive I/O bus cycle.

The device selection unit is activated after detecting the initiation of an I/O bus cycle. The device selection unit identifies the I/O device selected for the I/O bus cycle from the I/O address. Upon identification of the I/O device, the device selection unit selects a time value from the programmable I/O recovery time registers corresponding to the I/O device selected. The selected time value is loaded into the decrementer. The decrementer is clocked such that each count in the decrementer corresponds to a clock cycle on the external bus. Upon termination of the bus cycle, the device selection unit generates a cycle start signal for the decrementer. The decrementer begins to count down from the time value loaded, and when the decrementer reaches a terminal count, the ready signal is generated.

The methods and apparatus of the present invention permit programming of recovery I/O delay times for peripheral components contained on the external bus. The programmable I/O recovery time registers are coupled to the CPU and memory via data, control and internal address lines. The data, control and internal address lines are also provided to the device selection. In order to program the individual I/O recovery delay times, a user of the computer system specifies I/O recovery delay times for the I/O peripheral components. In a preferred embodiment, the ROM BIOS contains a plurality of standard I/O recovery delay times for standard peripheral components such as floppy drives, hard drives, and keyboards. Through computer system configuration programs, a user may change the standard I/O recovery delay times for a particular I/O device. When the computer system is initialized, either the standard I/O recovery delay times from the ROM BIOS or the programmed I/O delay times from the system configuration program are loaded into recovery time registers. When a particular I/O device is accessed, the corresponding I/O recovery time is used to delay successive accesses to the particular I/O device. In a computer system utilizing programmable I/O recovery, the computer system is no longer constrained by the I/O device comprising the longest I/O recovery time.

BRIEF DESCRIPTION OF THE DRAWINGS

The objects features and advantages of the present invention will be apparent from the following detailed description of the preferred embodiment of the invention with references to the drawings in which.

NOTION AND NOMENCLATURE

Figure 1:
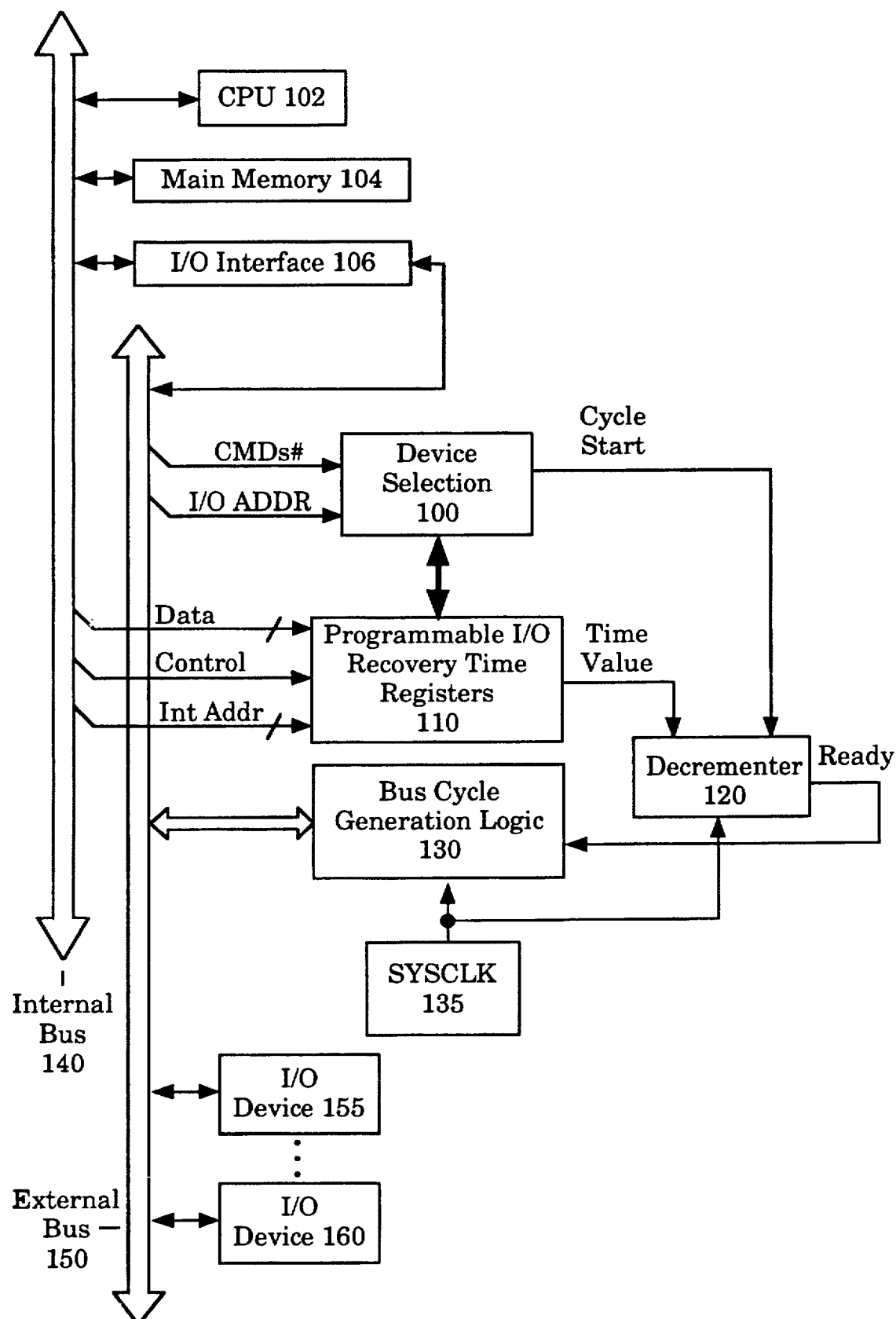
FIG. 1 illustrates a high level block diagram for programmable I/O recovery configured in accordance with the present invention.

The detailed descriptions which follow are presented largely in terms of algorithms and symbolic representations of operations within a computer system. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below. Machines which may perform the functions of the present invention include those manufactured by Intel Corporation, as well as other manufacturers of computer systems.

DETAILED DESCRIPTION OF THE INVENTION

Methods and apparatus for programmable input/output (I/O) recovery are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

The methods and apparatus of the present invention permit programming of recovery I/O delay times for peripheral components contained on a computer bus. In order to program the individual I/O recovery delay times, a user of the computer system specifies an I/O recovery delay time, in system clock cycles, during computer initialization. In a preferred embodiment, the ROM BIOS contains a plurality of standard I/O recovery delay times for standard peripheral components such as floppy drives, hard drives, and keyboards. Through computer system configuration programs, a user may change the standard I/O recovery delay times for a particular I/O device. When the computer system is booted, either the standard I/O recovery delay times from the ROM BIOS or the programmed I/O delay times from the system configuration program are loaded into recovery time registers. When a particular I/O device is accessed, the corresponding I/O recovery time is used to delay a subsequent access to the I/O devices. In a computer system utilizing programmable I/O recovery, the computer system is no longer constrained by the I/O device comprising the longest I/O recovery time.

Referring to FIG. 1, a high level block diagram for programmable I/O recovery configured in accordance with the present invention is illustrated. The apparatus for programmable I/O recovery comprises device selection 100 and programmable I/O recovery time registers 110. The device selection 100 is coupled to an external bus 150, and the programmable I/O recovery time registers 110 are coupled to an internal bus 140. The external bus is coupled to a plurality of input/output (I/O) devices (not shown). The internal bus 140 is coupled to a central processing unit (CPU) and memory. Although an internal bus 140 and external bus 150 is shown in FIG. 1, a single bus coupling both the internal computer resources and external peripheral components could be used without deviating from the spirit or scope of the invention.

Also coupled to the external bus 150 is cycle generation logic 130. The cycle generation logic 130 generates a plurality of bus cycle signals to operate and control the external bus 150. The cycle generation logic 130 is intended to represent a broad category of bus controllers which are well known in the art and will not be described further. Coupled to the cycle generation logic 130 is a system clock (SYSCLK) 135. The SYSCLK provides timing for the external bus 150. The programmable I/O recovery apparatus also comprises a decrementer or programmable counter 120. The decrementer 120 generates a ready signal to the cycle generation logic 130. The ready signal indicates to the cycle generation logic 130 that a successive bus cycle may begin. The programmable I/O recovery time registers 110 are coupled to the CPU and memory via data, control and internal address (Int Addr) lines. The data, control and internal address lines are also provided to the device selection 100. The device selection 100 receives commands generated by the cycle generation logic 130 and an I/O address from the external bus 150.

Figure 2:
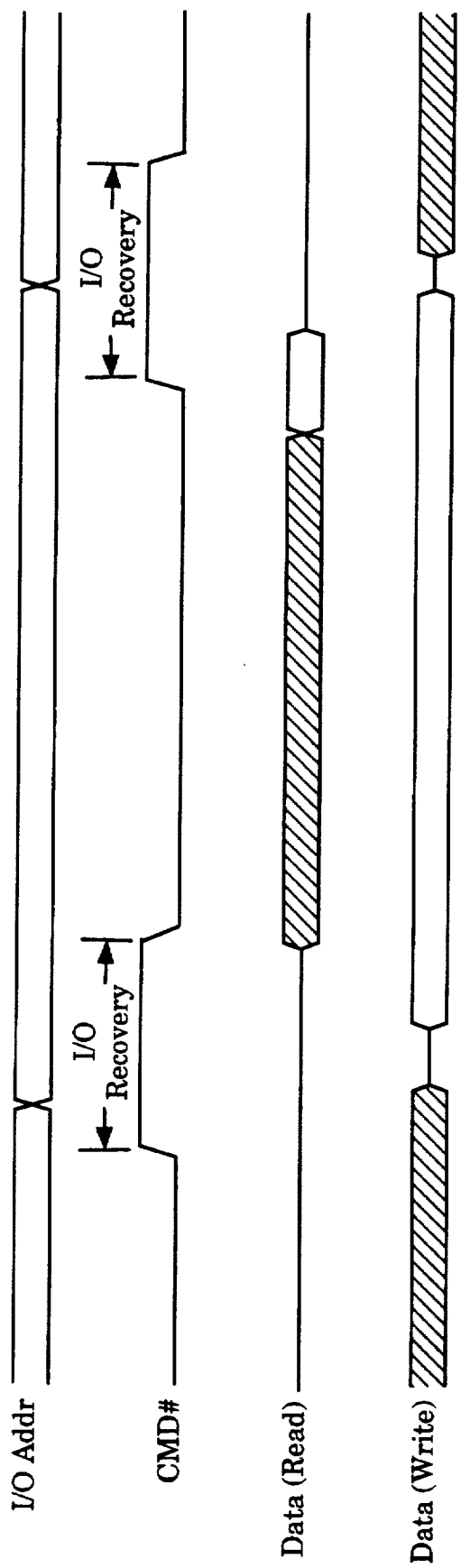
FIG. 2 illustrates a timing diagram for a bus cycle configured in accordance with the present invention.

Referring to FIG. 2, a timing diagram for a bus cycle configured in accordance with the present invention is illustrated. For the bus cycle illustrated in FIG. 2, the CMD# signal signifies the request for an I/O bus operation. The I/O bus operation requested comprises either a read or write operation with an I/O device. Initially, the CMD# signal in FIG. 2 is shown in a de-activated state, and a high to low transition of the CMD# signal signifies the beginning of an I/O bus cycle. The duration of an I/O bus cycle is equal to the duration of the low state of the CMD# signal. The time duration when the CMD# signal resides in the high state signifies the time period between I/O bus cycles. When successive accesses to the same I/O device are desired, the time duration of the CMD# signal in the high state equals the I/O recovery time. Also shown in FIG. 2 is an I/O address (Addr), Data Read, and Data Write. The bus cycle signals shown in FIG. 2 are provided for explanation purposes only, and any bus cycle signals could be used without deviating from the spirit and the scope of the present invention.

Figure 3:
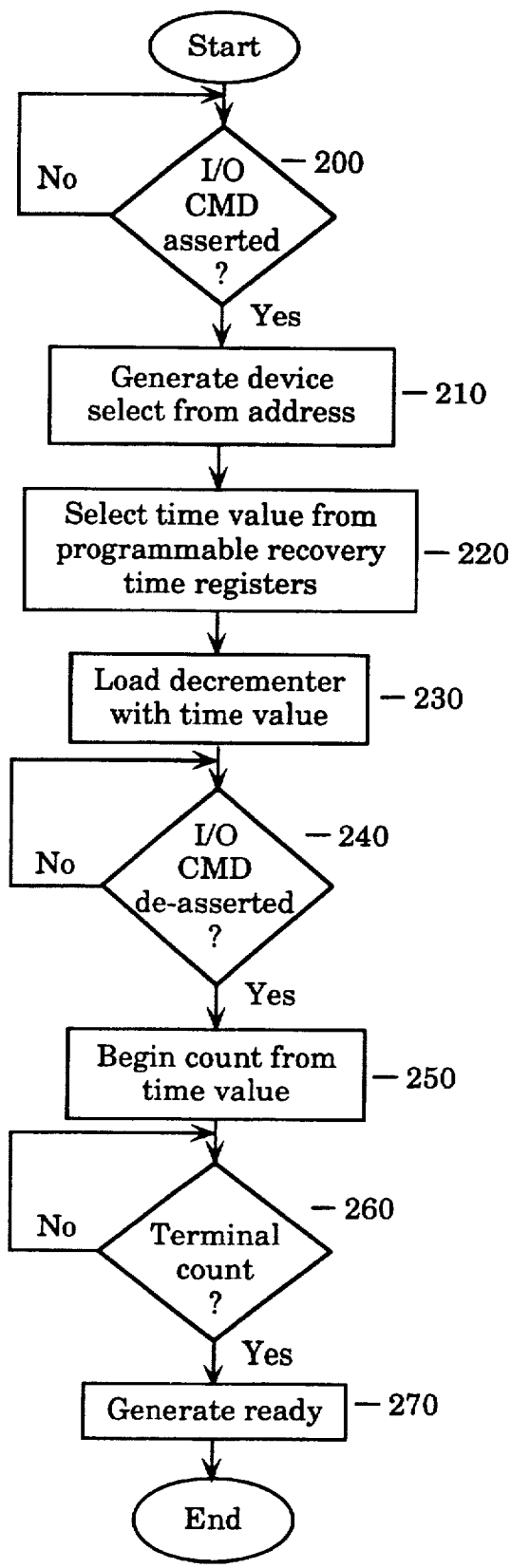
FIG. 3 illustrates a flow diagram for a method of programmable I/O recovery configured in accordance with the present invention.

Referring to FIG. 3, a flow diagram for a method of programmable I/O recovery configured in accordance with the present invention is illustrated. The device selection 100 is activated when an I/O CMD# signal is asserted. For the bus cycle illustrated in FIG. 2, the beginning of an I/O bus cycle is signified by the falling edge of the CMD# signal. After detecting the initiation of an I/O bus cycle, the device selection 100 identifies the I/O device selected for the I/O bus cycle from the I/O address. Upon identification of the I/O device, the device selection 100 selects a time value from the programmable I/O recovery time registers 110 corresponding to the I/O device selected. The selected time value is loaded into the decrementer 120 to program the decrementer 120 to count down from the time value loaded. The decrementer 120 is clocked by the SYSCLK 135, such that each count in decrementer 120 corresponds to a clock cycle on the external bus 150. Therefore, the time value stored in the programmable I/O recovery time registers 110 represents the number of SYSCLK cycles required for the I/O recovery delay. The device selection 100 determines the end of the bus cycle from the rising edge of the I/O CMD# signal. Upon termination of the bus cycle, the device selection 100 generates a cycle start signal for the decrementer 120. The cycle start signal enables the decrementer 120 such that the decrementer 120 begins to count down from the time value loaded. When the decrementer 120 reaches a terminal count, or zero, a ready signal is generated. As discussed above, the ready signal enables bus cycle generation 130 so that a subsequent bus cycle for an I/O device may be generated.

Figure 4:
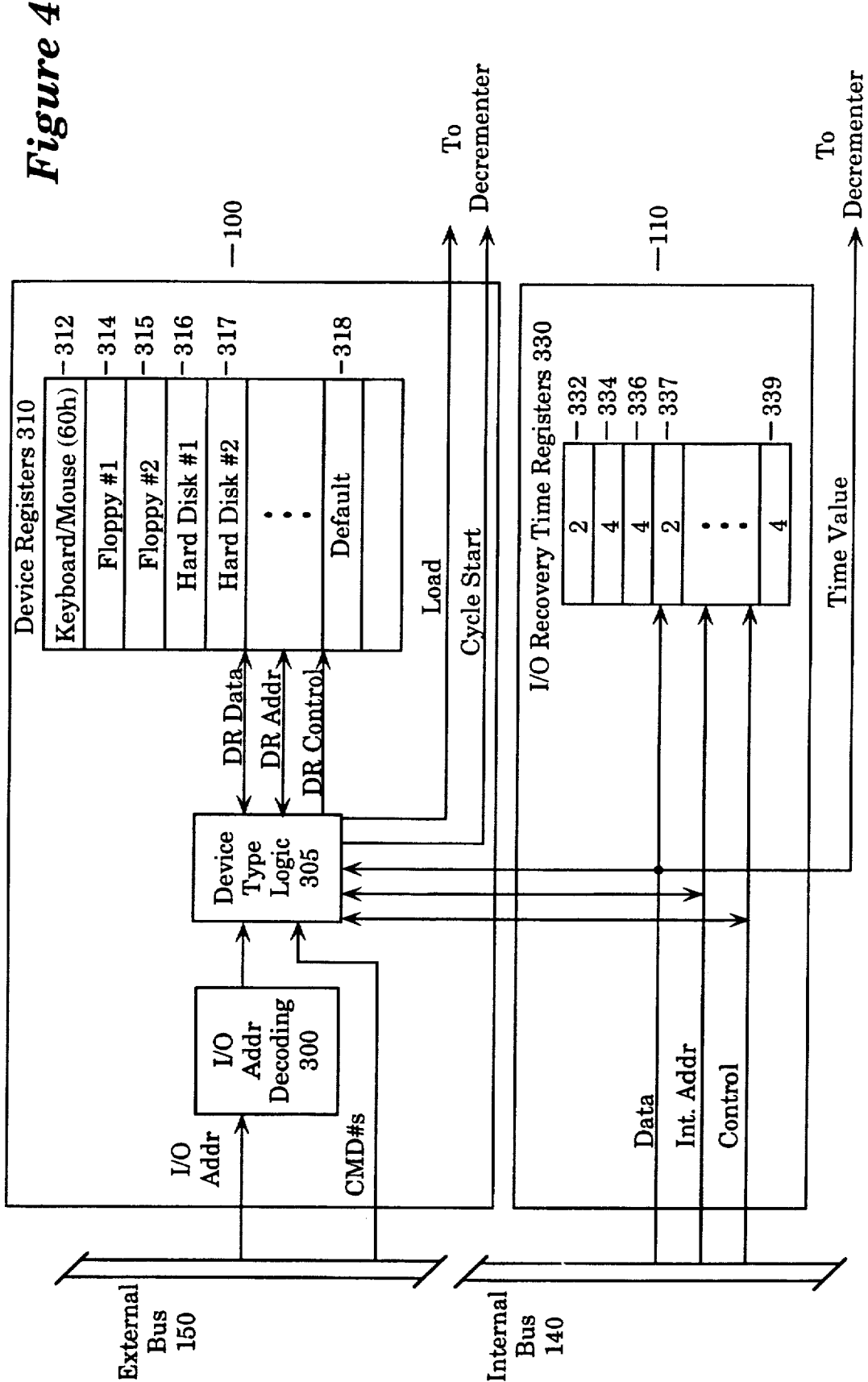
FIG. 4 illustrates a device selection unit and programmable I/O recovery time registers configured in accordance with the present invention.

Referring to FIG. 4, the device selection and programmable I/O recovery time registers configured in accordance with the present invention are illustrated. The device selection 100 comprises I/O address decoding 300, device type logic 305, and device registers 310. The I/O address decoding 300 is coupled to the device type logic 305, and decodes addresses input from the external bus 150. The device type logic 305 receives as inputs a plurality of signals including CMD#s signals, decoded I/O addresses, and internal data, address and control lines from the internal bus 140. The device type logic 305 is coupled to the device registers 310 by DR data lines, DR address lines, and DR control lines. The device registers 310 store a plurality of I/O addresses for the I/O devices on the external bus 150. The device registers 310 are controlled by device type logic 305 to write or read the register contents. For the example illustrated in FIG. 4, the device registers 310 contain known I/O addresses for IBM™ PC/AT compatible computer systems. As shown in FIG. 4, an I/O address for a keyboard controller, located at 60 hexadecimal, is stored in device register 312. Similarly, additional I/O addresses for I/O devices such as floppy drives and hard disk drives are stored in device registers 314, 315, 316 and 317. In addition to storing a plurality of I/O addresses for known I/O device locations, a default I/O address is stored in a device register 318.

Each device register in device selection 100 contains a corresponding I/O recovery time register. The I/O recovery time registers 330 each contain an integer value representing the number of SYSCLK cycles for the I/O recovery delay time. For the I/O devices illustrated in FIG. 4, the device register 312 corresponds to the I/O recovery time register 332. Therefore, the keyboard controller, comprising the I/O address of 60 hexadecimal, contains an I/O recovery delay of two cycles. Similarly, all I/O devices having I/O addresses stored in the device registers 310 have a corresponding time value stored in the I/O recovery time registers 330. For the device register 318 containing the default device, a corresponding default time value is stored in the I/O recovery time register 339. In a preferred embodiment, the I/O default recovery time value is 4 SYSCLK cycles.

In a preferred embodiment of the present invention, the device registers 310 and the I/O recovery time registers 330 are programmed during initialization of the computer system. For known I/O addresses, such as floppy drives and hard drives, the ROM BIOS programs the I/O recovery time registers 330 with standard time values. The standard time values are selected based on a minimum I/O recovery time for a particular I/O device type. In addition to the time values stored for the known I/O addresses, a system configuration program is provided so that a user may change the standard time values. The configuration program contains a user interface to display information to a user. For example, a configuration program may display to the user the standard time values for the known I/O devices. If the computer system contains a hard drive which comprises a shorter I/O recovery time than the standard time value, then the user enters the new time value into the configuration program via the user interface. Consequently, during initialization of the computer system, the original standard time values are overwritten by the programmed time values. In addition to the I/O addresses for known I/O devices, a user may program additional time values for I/O devices installed in the computer system. For the new I/O devices, the user enters a time value for the I/O recovery delay time for each new I/O device. During initialization of the computer system, the time values for the I/O devices are programmed in the recovery time registers 330.

To program the device registers 310 and the I/O recovery time registers 330, the ROM BIOS and configuration programs contain I/O addresses with corresponding time values as discussed above. During initialization of the computer system, the CPU 102 transfers an I/O address and an internal address (Int Addr) via the internal bus 140 to the device registers 310 for each I/O device. A device register is selected by the Int Addr, and a write operation is indicated to the device registers 310 through the control lines on the internal bus 140. Similarly, the CPU 102 transmits time values on the data lines and an internal address on the Int Addr lines. From the internal address, an I/O recovery time register is selected for a write operation. Also, the CPU 102 sets the control lines to signify to the I/O recovery time registers that the access is a write operation. The CPU 102 writes an I/O address in a first register in the device registers 310, and the CPU 102 writes a corresponding time value to a first register in the I/O recovery time registers 330 to generate the I/O address and corresponding time value. In this way, all I/O addresses are written to the device registers 310, and all the corresponding time values are written to the recovery time registers 330.

Figure 5:
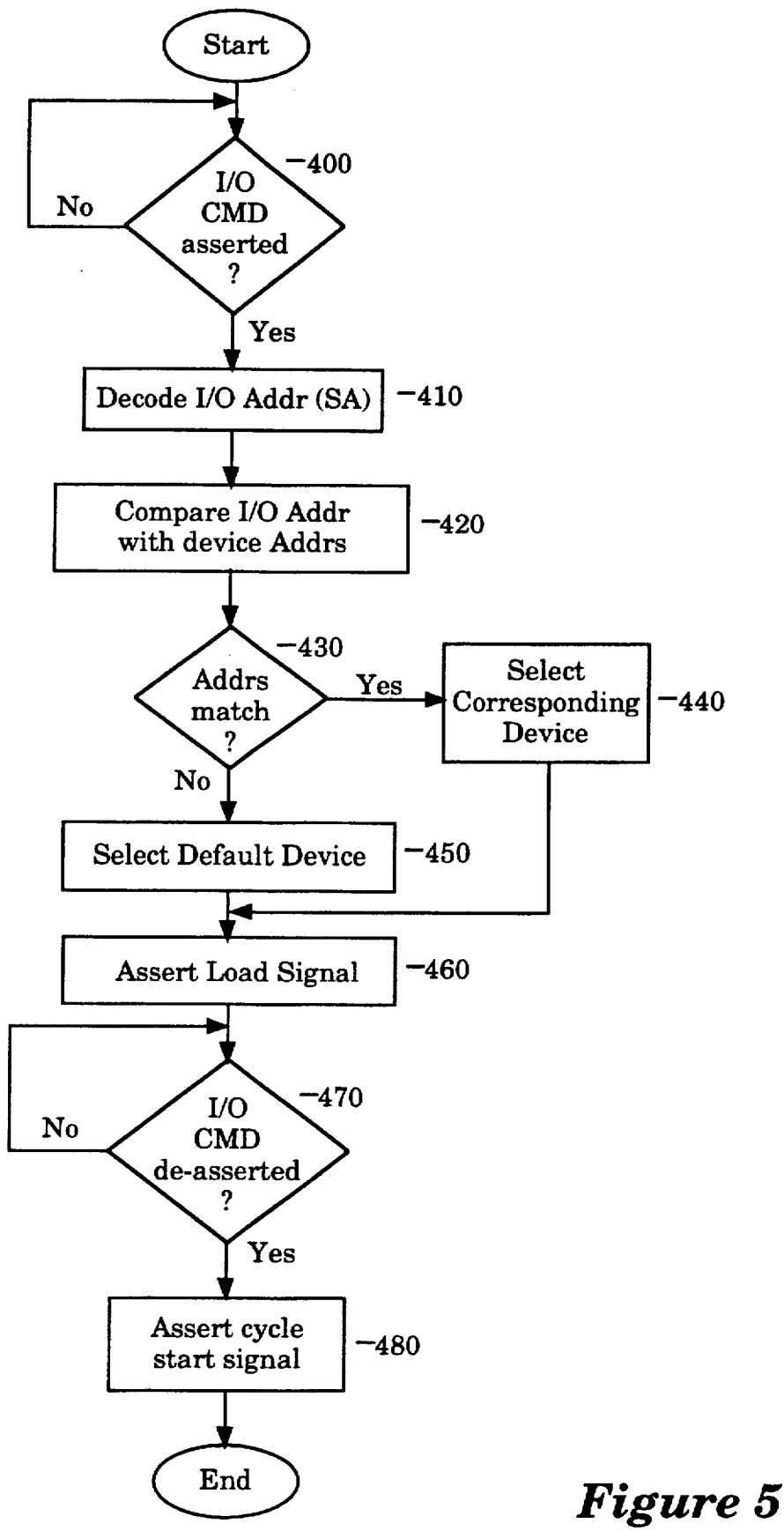
FIG. 5 illustrates a flow diagram for a device type logic configured in accordance with the present invention.

Referring to FIG. 5, a flow diagram for the device type logic configured in accordance with the present invention is illustrated. The device type logic 305 is activated when an I/O bus cycle is initiated. When an I/O bus cycle is initiated as indicated by the assertion of a command signal, the device type logic 305 inputs the I/O address decoded from I/O address decoding 300. The device type logic 305 compares the decoded I/O address with each I/O address stored in the device registers 310. The device type logic 305 is coupled to the device registers 310 through DR data lines, DR address lines, and DR control lines. The device type logic 305 reads an I/O address stored in the device registers 310 and compares the I/O address with the decoded I/O address input. If an address match occurs, the device type logic 305 generates an internal address for the I/O recovery time registers 330 corresponding to the I/O device matched. For example, if the floppy #1 I/O address matched, then the device type logic 305 selects the corresponding I/O recovery time register 334. The generation of an internal address for the selection of the corresponding I/O recovery time register may be accomplished through any means. For example, to generate the internal address, the device type logic 305 may generate a count for the number of addresses read before an address match occurs. The number generated by the count identifies a device register and a corresponding I/O recovery time register. The number is added to a base address to generate the internal address for the corresponding I/O recovery time register.

If no addresses match, the device type logic 305 selects the default device. For the example shown in FIG. 4, the default device is stored in device register 318. In this example, the device type logic 305 selects the recovery time register 339 for the default time value. After generating the internal address to select the proper recovery time register, the device type logic 305 reads the time value from the recovery time register. The device type logic 305 then asserts the load signal to the decrementer 120 to load the time value into the decrementer. The device type logic 305 monitors the I/O command to detect when the I/O command is de-asserted. When the I/O command is de-asserted, the device type logic 305 asserts the cycle start signal. The cycle start signal enables the decrementer to begin counting down from the time value loaded. At this point, the device type logic 305 is ready to accept the next command signal.

In an alternative embodiment, additional signals, identifying the bus cycle as an 8 bit or 16 bit cycle, are provided from the external bus 150 to the device selection 100. The additional signals are used to generate a time value for default conditions based on whether the I/O request is for an 8 bit cycle or a 16 bit cycle. For example, in an IBM™ PC/AT compatible computer, I/O devices, located on an EISA compatible bus, are accessed in an 8 bit, 16 bit or 32 bit cycle. When a default condition occurs, the I/O recovery apparatus of the present invention selects a time value based on whether the I/O cycle is a 8 bit or 16 bit cycle. In this embodiment, the device type logic 305 reads a signal to select the device type when no address match occurs. Because the 16 bit cycle is a newer specification, the 16 bit I/O cycle devices comprise shorter I/O recovery delay times. Therefore, if an I/O recovery value is not known for a particular input I/O address, the 8 or 16 bit cycle criteria provides a more accurate recovery delay time for the default condition. As will be apparent by one skilled in the art, any signal may be used to further discern the I/O recovery time for an I/O bus cycle.

Figure 6:
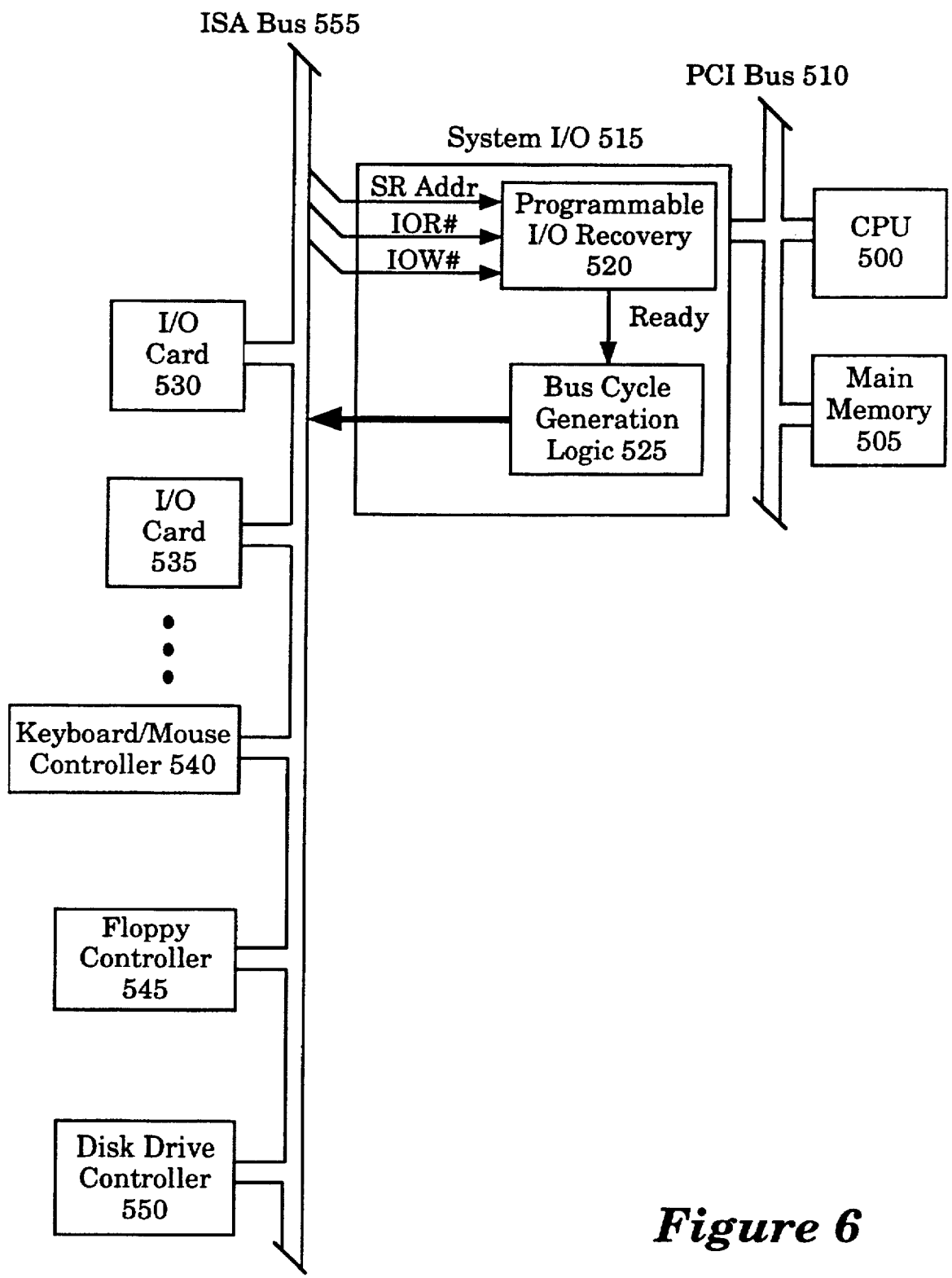
FIG. 6 illustrates a computer system incorporating programmable I/O recovery configured in accordance with the present invention.

Referring to FIG. 6, a computer system incorporating the teachings of the present invention is illustrated. The computer system comprises a central processing unit (CPU) 500, and a main memory 505 connected via a peripheral component interconnect (PCI) bus 510. The computer system also contains an ISA bus to couple the keyboard mouse controller 540, the floppy controller 545, disc drive controller 550 to the computer system. Additional I/O device components, such as I/O cards 530 and 535, are also coupled to the computer system on the ISA bus 555. The PCI bus 510 and ISA bus 555 are coupled via a system I/O 515. The system I/O 515 comprises a plurality of functions to integrate the PCI bus 510 to the ISA bus 555. In a preferred embodiment, the system I/O 515 comprises an integrated circuit, SIO 82378IB, manufactured by Intel™ Corporation, the Assignee of the present invention. For a further description of SIO 82378IB, see System I/O SIO 82378IB, revision 1.0, Order Number: 290473-001, Intel™ Corporation.

In part, the system I/O 515 contains programmable I/O recovery 520 and cycle generation logic 525. The programmable I/O recovery 520 receives both 8 and 16 bit I/O addresses from the ISA bus 555. In addition, the programmable I/O recovery receives IOR# and IOW# signals. The cycle generation logic 525 generates a bus cycle in accordance with the timing diagram of FIG. 2. In operation, the cycle generation logic 525 generates bus signals for transfer data on the ISA bus 555. As described above, if the bus transfer is an I/O transfer, the programmable I/O recovery reads the SA address and generates the ready signal for the corresponding I/O device in accordance with the programmable I/O recovery apparatus of the present invention.

Although the present invention has been described in terms of a preferred embodiment, it will be appreciated that various modifications and alterations might be made by those skilled in the art without departing from the spirit and scope of the invention. The invention should therefore be measured in terms of the claims which follow.

We claim:

1. In a computer system comprising a bus, a central processing unit (CPU) and a plurality of input/output (I/O) devices coupled to said bus, a method for programmable I/O recovery, said method composing the steps of:

storing a plurality of I/O addresses wherein each of said plurality of I/O addresses uniquely identifies an I/O device coupled to said bus;

storing a plurality of time values wherein each of said plurality of time values corresponds to one of said plurality of I/O addresses stored and one of said I/O devices on said bus, each of said time values specifying a minimum I/O recovery time for a corresponding I/O device, said minimum I/O recovery time being dependent on said I/O device corresponding to said I/O address;

generating a bus cycle in a bus controller to effectuate an I/O bus transfer, said bus cycle including a bus address for identifying an I/O device for said I/O bus transfer, and a command signifying said bus cycle comprises an I/O bus transfer;

comparing said bus address with said plurality of I/O addresses stored when said command indicates an I/O bus cycle;

selecting a time value stored corresponding to an I/O address when said bus address is equal to one of said plurality of I/O addresses stored;

selecting a bus cycle default time value when said bus address is not equal to one of said plurality of I/O addresses stored;

generating a cycle start signal in response to a termination of said bus cycle; and delaying generation in said bus controller of a subsequent I/O bus cycle on said bus in response to said cycle start signal in accordance with said time value selected such that successive I/O accesses are delayed by disabling I/O bus cycles in said bus controller for a time defined by said time value.

2. The method for programmable I/O recovery as claimed in claim 1 wherein the step of storing a plurality of time values further comprises the step of storing a default time value, said default time value specifying a maximum I/O recovery delay time in accordance with an I/O recovery specification for said bus.

3. The method for programmable I/O recovery as claimed in claim 1 wherein the step of storing a plurality of time values comprises the steps of:

providing a BIOS routine comprising a plurality of standard time values wherein said plurality of standard time values specifies I/O recovery delay times for standard I/O devices; and executing said BIOS routine upon initialization of said computer system, said BIOS routine storing said plurality of I/O addresses and said corresponding time values for said standard I/O devices.

4. The method for programmable I/O recovery as claimed in claim 3 wherein the step of storing a plurality of time values further comprises the steps of:

providing a configuration program for said computer system, said configuration program comprising a user interface wherein said user interface allows a user to enter a user specified time value for each I/O device installed in said computer system; and executing said configuration program upon initialization of said computer system, said configuration program storing said plurality of I/O addresses and said corresponding user specified time values including replacing said standard time values for said standard I/O devices with said user specified time values.

5. In a computer system comprising a bus, a central processing unit (CPU) and a plurality of input/output (I/O) devices coupled to said bus, an apparatus for programmable I/O recovery, said apparatus comprising:

storage means for storing a plurality of I/O addresses, a plurality of time values, and a plurality of bus cycle default time values each of said plurality of I/O addresses uniquely identifying an I/O device coupled to said bus, and each of said plurality of time values corresponds to one of said plurality of I/O addresses stored and one of said I/O devices on said bus, each of said plurality of time values specifying a minimum I/O recovery time for a corresponding I/O device, said minimum I/O recovery time being dependent on corresponding said I/O device, said plurality of bus cycle default time values being based on a bus cycle type;

bus cycle generation means coupled to said bus for generating an I/O bus cycle to effectuate an I/O bus transfer, said I/O bus cycle including a bus address for identifying an I/O device for said I/O bus transfer, and a command signifying said I/O bus cycle;

selection means coupled to said storage means and said bus for selecting a time value based on said bus address, said selection means comparing said bus address with said plurality of I/O addresses stored when said command indicates an I/O bus cycle, and said selection means for selecting a time value stored corresponding to an I/O address when said bus address is equal to one of said plurality of I/O addresses stored, and for selecting a bus cycle default time value, in accordance with said bus cycle type, when said bus address is not equal to one of said plurality of I/O addresses stored, said selection means generating a cycle start signal in response to a termination of said I/O bus cycle; and delay means coupled to said selection means and said bus cycle generation means for delaying generation of a subsequent bus cycle in accordance with said time value selected such that successive I/O accesses are delayed by said time value by disabling the bus cycle generation means to issue a subsequent bus cycle.

6. The apparatus for programmable I/O recovery as claimed in claim 5 wherein said storage means comprising a plurality of time values includes a default time value, said default time value for specifying a maximum I/O recovery delay time in accordance with an I/O recovery specification for said bus.

7. The apparatus for programmable I/O recovery as claimed in claim 5 wherein said storage means further comprises programming means including a BIOS routine comprising a plurality of standard time values for specifying I/O recovery delay times for standard I/O devices, said programming means for executing said BIOS routine upon initialization of said computer system so as to store said plurality of I/O addresses and said corresponding time values for said standard I/O devices.

8. The apparatus for programmable I/O recovery as claimed in claim 7 wherein said programming means further comprises configuration means for configuring said computer system, said configuration means comprising a user interface wherein said user interface allows a user to enter a user specified time value for each I/O device installed in said computer system, said programming means for executing said configuration means upon initialization of said computer system so as to store said plurality of I/O addresses and said corresponding user specified time values in said storage means, said user specified time values replacing said standard time values when user specified time values specify I/O addressees having standard time values.

9. In a computer system comprising a bus, a central processing unit (CPU) and a plurality of input/output (I/O) devices coupled to said bus, an apparatus for programmable I/O recovery, said apparatus comprising:

a plurality of device registers for storing a plurality of I/O addresses wherein each of said plurality of I/O addresses uniquely identifies an I/O device coupled to said bus;

a plurality of I/O recovery time registers for storing a plurality of time values and a plurality of bus cycle default time values wherein each of said plurality of time values corresponds to one of said plurality of I/O addresses stored and one of said I/O devices on said bus, each of said plurality of time values specifying a minimum I/O recovery time for a corresponding I/O device, said minimum I/O recovery time dependent on corresponding said I/O device, said plurality of bus cycle default time values being based on a bus cycle type;

a bus controller coupled to said bus for generating an I/O bus cycle to effectuate an I/O bus transfer and for delaying subsequent I/O bus cycles when said minimum I/O recovery time for said I/O device has not elapsed, said I/O bus cycle including a bus address for identifying an I/O device for said I/O bus transfer, and a command signifying said I/O bus cycle;

selection logic coupled to said plurality of device registers, said plurality of I/O recovery time registers, and said bus for selecting a time value based on said bus address, said selection logic being constructed to receive said bus address and said command and for comparing said bus address with said plurality of I/O addresses stored when said command indicates an I/O bus cycle, said selection logic for selecting a time value stored corresponding to an I/O address when said bus address is equal to one of said plurality of I/O addresses stored, and for selecting a bus cycle default time value, in accordance with said bus cycle type, when said bus address is not equal to one of said plurality of I/O addresses stored, said selection logic generating a cycle start signal in response to a termination of said I/O bus cycle; and a decrementer coupled to said selection logic and said bus controller for delaying generation of a subsequent bus cycle by disabling said bus controller, said decrementer being constructed to receive said time value and for decrementing said time value in response to said cycle start signal such that generation of a terminal count in said decrementer enables said bus controller to generate a subsequent I/O bus cycle such that successive I/O accesses are delayed by said time value.

10. The apparatus for programmable I/O recovery as claimed in claim 9 wherein one of said plurality of I/O recovery time registers is constructed to store a computer system default time value, said computer system default time value for specifying a maximum I/O recovery delay time in accordance with an I/O recovery specification for said bus.

11. The apparatus for programmable I/O recovery as claimed in claim 9 further comprising a BIOS routine for programming said plurality of device registers and said plurality of I/O recovery time registers, said BIOS routine comprising a plurality of standard time values for specifying I/O recovery delay times for standard I/O devices, said BIOS routine being executed upon initialization of said computer system so as to store said plurality of I/O addresses and said corresponding time values for said standard I/O devices.

12. The apparatus for programmable I/O recovery as claimed in claim 11 further comprising a configuration program far configuring said computer system, said configuration program comprising a user interface wherein said user interface allows a user to enter a user specified time value for each I/O device installed in said computer system, said configuration program being executed upon initialization of said computer system so as to store said plurality of I/O addresses in said device registers and said corresponding user specified time values in said I/O recovery time values, said user specified time values replacing said standard time values when user specified time values specify I/O addresses having standard time values.

13. A computer system comprising:

processing means;

storage means;

first bus means, wherein said first bus means couples said processing means to said storage means;

I/O component means for providing a plurality of functions to said computer system;

second bus means, wherein said second bus means couples said plurality of I/O devices to said computer system; and system input/output (SIO) interface means coupled to said first bus means and said second bus means for interfacing said processing means and storage means to said plurality of I/O component means, said SIO interface means comprising;

bus cycle generation means for generating an I/O bus cycle to effectuate an I/O bus transfer on said second bus means, said I/O bus cycle including a bus address for identifying an I/O device for said I/O bus transfer, and a command signifying said I/O bus cycle, programmable I/O recovery means for enabling said bus cycle generation means, said programmable I/O recovery means comprising:

storage means for storing a plurality of I/O addresses, a plurality of time values, and a plurality of bus cycle default time values, wherein each of said plurality of I/O addresses uniquely identifying said I/O component means, and each of said plurality of time values corresponds to one of said plurality of I/O addresses stored and one of said I/O component means on said bus, each of said plurality of time values specifying a minimum I/O recovery time for a corresponding I/O component means, said minimum I/O recovery time depending on corresponding said I/O device, said plurality of bus cycle default time values being based on a bus cycle type;

selection means coupled to said storage means and said second bus means for selecting a time value based on said bus address, said selection means for comparing said bus address with said plurality of I/O addresses stored when said command indicates an I/O bus cycle, and said selection means for selecting a time value stored corresponding to an I/O address when said bus address is equal to one of said plurality of I/O addresses stored, and for selecting a bus cycle default time value, in accordance with said bus cycle type, when said bus address is not equal to one of said plurality of I/O addresses stored, said selection means generating a cycle start signal in response to a termination of said I/O bus cycle; and delay means coupled to said selection means and said bus cycle generation means for delaying generation of a subsequent bus cycle in response to said cycle start signal by disabling said bus cycle generation means in accordance with said time value selected such that successive I/O accesses are delayed by a time defined by said time value.

14. The computer system as claimed in claim 13 wherein said bus cycle generation means for generating I/O bus cycles in accordance with an industry standard architecture (ISA) specification for 8 bit and 16 bit bus cycles and an extended industry standard architecture (EISA) specification for 8 bit, 16 bit and 32 bit bus cycles.

15. The computer system as claimed in claim 13 wherein said second bus means comprises an industry standard architecture (ISA) bus.

16. The computer system as claimed in claim 13 wherein said first bus means comprises a peripheral component interconnect (PCI) bus.

17. A computer system comprising:

a central processing unit (CPU);

main memory;

an internal bus, wherein said internal bus couples said main memory to said CPU;

a plurality of I/O devices for providing a plurality of functions to said computer system;

an external bus, wherein said external bus couples said plurality of I/O devices to said computer system; and a system input/output (SIO) interface coupled to said internal bus and said external bus for interfacing said CPU and main memory to said plurality of I/O devices, said SIO interface comprising;

bus cycle generation logic for generating an I/O bus cycle to effectuate an I/O bus transfer on said external bus, said I/O bus cycle including a bus address for identifying an I/O device for said I/O bus transfer, and a command signifying said I/O bus cycle including said bus cycle type, programmable I/O recovery logic for enabling said bus cycle generation logic, programmable I/O recovery logic comprising:

a plurality of I/O recovery time registers for storing a plurality of time values and a plurality of bus cycle default time values wherein each of said plurality of time values corresponds to one of said plurality of I/O addresses stored and one of said I/O devices on said bus, each of said plurality of time values specifying a minimum I/O recovery time for a corresponding I/O device, said minimum I/O recovery time depending on corresponding said I/O device, said plurality of bus cycle default time values being based on a bus cycle type;

selection logic coupled to said plurality of device registers, said plurality of I/O recovery time registers, and said bus for selecting a time value based on said bus address, said selection logic being constructed to receive said bus address and said command and for comparing said bus address with said plurality of I/O addresses stored when said command indicates an I/O bus cycle, said selection logic for selecting a time value stored corresponding to an I/O address when said bus address is equal to one of said plurality of I/O addresses stored, and for selecting a bus cycle default time value, in accordance with said bus cycle type, when said bus address is not equal to one of said plurality of I/O addresses stored, said selection logic generating a cycle start signal in response to a termination of said I/O bus cycle; and a decrementer coupled to said selection logic and said bus cycle generation logic for delaying generation of a subsequent bus cycle by disabling said bus cycle generation logic, said decrementer being constructed to receive said cycle start signal and said time value and for decrementing said time value such that generation of a terminal count in said decrementer enables said bus controller to generate a subsequent I/O bus cycle such that successive I/O accesses are delayed by a time defined by said time value.

18. The computer system as claimed in claim 17 wherein said bus cycle generation logic for generating I/O bus cycles in accordance with an industry standard architecture (ISA) specification for 8 bit and 16 bit bus cycles, and an extended industry standard architecture (EISA) specification for 8 bit, 16 bit and 32 bit bus cycles.

19. The computer system as claimed in claim 17 wherein said external bus comprises an industry standard architecture (ISA) bus.

20. The computer system as claimed in claim 17 wherein said internal bus comprises a peripheral component interconnect (PCI) bus.

\* \* \* \* \*

UNITED STATES PATENT AND TRADEMARK OFFICE
CERTIFICATE OF CORRECTION

PATENT NO. : 5,537,664
DATED : July 16, 1996
INVENTOR(S) : Rowland et al.

It is certified that error appears in the above-identified patent and that said Letters Patent is hereby corrected as shown below:

In column 12 at line 10 delete "far" and insert --for--

Signed and Sealed this

Twenty-fourth Day of June, 1997

*Attest:*

BRUCE LEHMAN

*Attesting Officer*    *Commissioner of Patents and Trademarks*